United States Patent [19]

Ishii et al.

[11] Patent Number: 4,716,982
[45] Date of Patent: Jan. 5, 1988

[54] FOUR WHEEL STEER CONTROL SYSTEM CONNECTED WITH LIMITED SLIP DIFFERENTIAL

[75] Inventors: Katsumi Ishii, Sagamihara; Kanae Hirayama, Yamato; Yoshio Matsuoka, Tokyo; Kotei Takahashi, Sagamihara, all of Japan

[73] Assignee: Nissan Motor Co., Ltd., Japan

[21] Appl. No.: 929,276

[22] Filed: Nov. 12, 1986

[30] Foreign Application Priority Data

Nov. 13, 1985 [JP] Japan ................................ 60-254498

[51] Int. Cl.$^4$ ............................................. B62D 5/06
[52] U.S. Cl. .................................... 180/140; 364/424
[58] Field of Search ............... 180/140, 233, 244, 247; 280/91; 364/424

[56] References Cited

U.S. PATENT DOCUMENTS 4,633,735 1/1987 Sakurai et al. ...................... 180/247

FOREIGN PATENT DOCUMENTS 55-76766 6/1980 Japan ................................... 180/140

Primary Examiner—John A. Pekar
Attorney, Agent, or Firm—Leydig, Voit & Mayer

[57] ABSTRACT

A four wheel steer control system includes a four wheel steer system, a differential between right and left driving wheels, a slip limiting system for limiting a differential action of the differential with a slip limiting resistive force whose magnitude is varied in accordance with a vehicle speed or other variable, a sensor for sensing the magnitude of the slip limiting resistive force, and a controller for controlling a ratio of a rear wheel steer angle to a steering wheel angle in accordance with the magnitude of the slip limiting resistive force.

6 Claims, 3 Drawing Figures

FOUR WHEEL STEER CONTROL SYSTEM CONNECTED WITH LIMITED SLIP DIFFERENTIAL

CROSS REFERENCES TO RELATED APPLICATIONS

The following patent applications relates to subject matter similar to that of the present application. (i) U.S. patent application Ser. No. 929,424, filed Nov. 12, 1986, ISHII et al., Corresponding foreign prior application Japanese patent application No. 60-254497. (ii) U.S. patent application Ser. No. 931,846 filed Nov. 18, 1986, ISHII et al., Corresponding foreign application Japanese patent application No. 60-260948.

BACKGROUND OF THE INVENTION

The present invention relates to a four wheel steer vehicle having a limited slip differential.

SUMMARY OF THE INVENTION

It is an object of the present invention to provide a four wheel steer control system which can maintain the optimum steering characteristic even when the magnitude of a slip limiting resistive force is changed in a limited slip differential.

According to the present invention, a four wheel steer vehicle comprises a four wheel steer system for varying at least a rear wheel steer angle in response to a control signal, a differential disposed between right and left driving wheels of the vehicle, a slip limiting means for limiting a differential action of the differential, a means for sensing a slip limiting amount of the slip limiting means, and a controlling means for producing the control signal and controlling a ratio of the rear wheel steer angle to a steering wheel angle in accordance with the slip limiting amount sensed by said slip limiting amount sensing means.

DETAILED DESCRIPTION OF THE INVENTION

Figure 1:
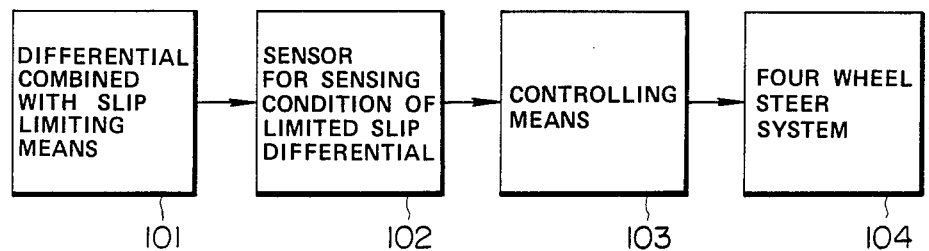
FIG. 1 is a block diagram showing a control system of the present invention.

FIG. 1 shows a control system of the present invention, which includes a differential combined with limited slip means 101, a sensor 102 for sensing a condition of the limited slip differential, a controlling means 103 and a four wheel steer system.

Figure 3:
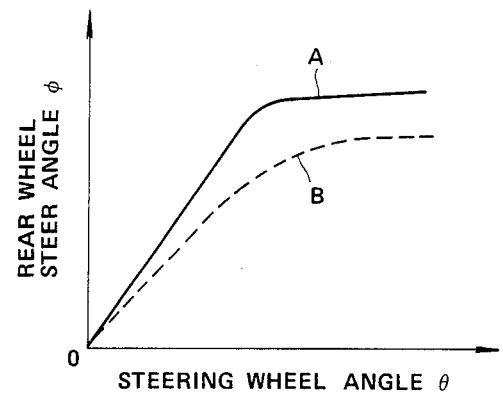
FIG. 3 is a graph showing relationships between a rear wheel steer angle $\phi$ and a steering wheel angle $\theta$.
Figure 2:
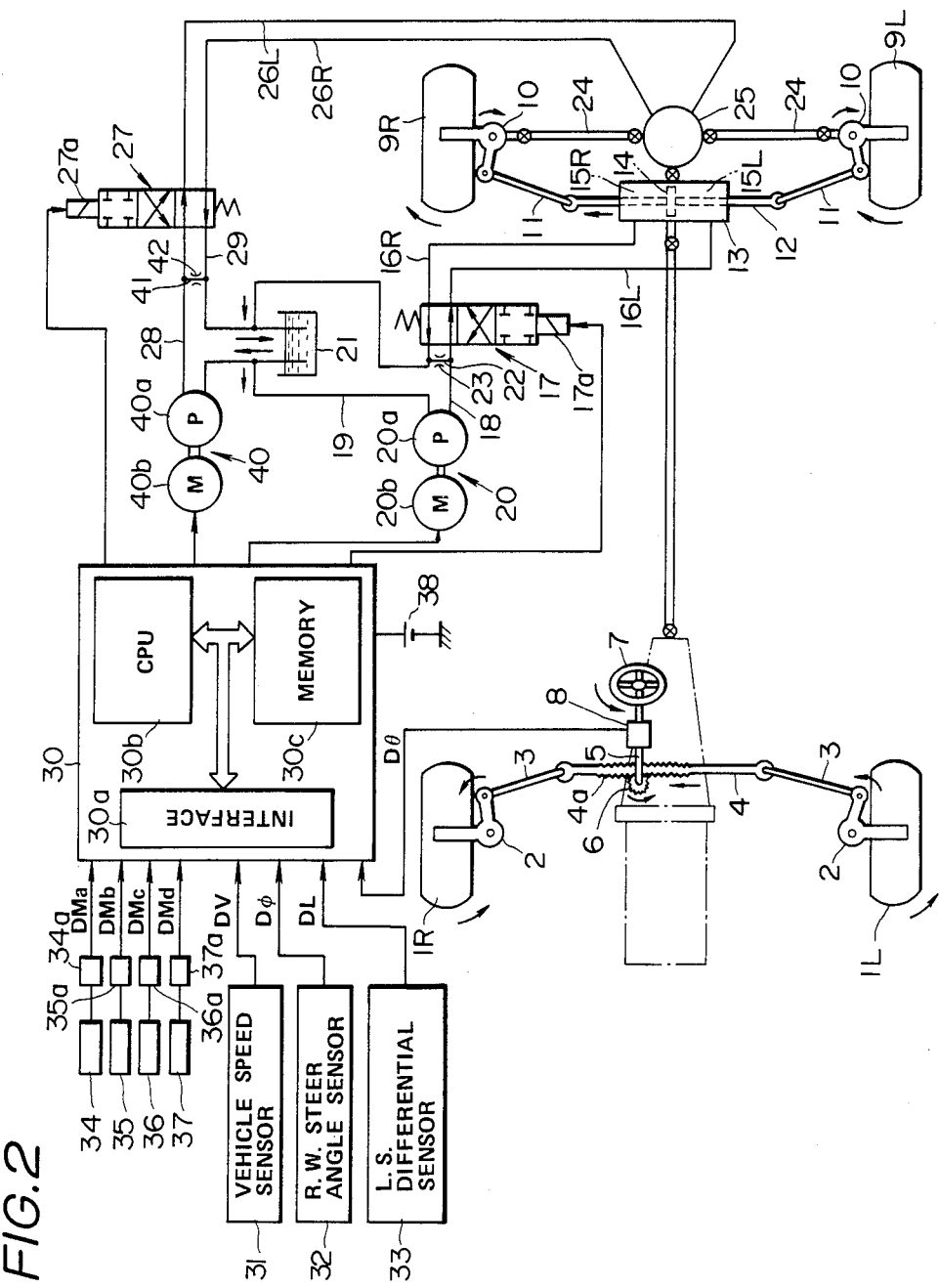
FIG. 2 is a schematic view showing one embodiment of the present invention.

One embodiment of the present invention is shown in FIGS. 2 and 3.

In FIG. 2, right and left front wheels 1R and 1L are rotatably supported, respectively, by right and left knuckle arms 2 which are swingably mounted on a vehicle body. The right and left knuckle arms 2 are connected to right and left ends of a rack rod 4 through right and left tie rods 3, respectively. The rack rod 4 is formed with a rack gear 4a which is engaged with a pinion 6 to form a rack and pinion type steering gear. The pinion 6 is provided at a bottom end of a steering shaft 5, and a steering wheel 7 is provided at a top end of the steering shaft 5. In the steering shaft 5, there is provided a steering wheel angle sensor 8, which delivers a steering wheel angle signal $\theta$ indicative of a steering wheel angle and a steering direction, to a controller 30.

Right and left rear wheels 9R and 9L are rotatably supported, respectively, by right and left knuckle arms 10 which are swingably mounted on the vehicle body. Both knuckle arms 10 are connected with each other by a rear wheel steering rod 12 through right and left tie rods 11. The steering rod 12 serves as a rod of a hydraulic cylinder actuator 13 of a double acting double ended rod type. The cylinder actuator 13 has right and left power chambers 15R and 15L which are separated by a piston 14 integrally mounted on the steering rod 12. The right and left power chambers 15R and 15L are connected, respectively, through fluid passages 16R and 16L, to an electromagnetic directional control valve 17 having four ports and three positions. A solenoid 17a of the control valve 17 is supplied with an exciting current by the controller 30. The controller 30 can select one of the three positions of the control valve 17 by varying the magnitude of the current supplied to the solenoid 17a.

The control valve 17 is connected with a fluid pressure source 20 through a supply passage 18 and a return passage 19. A reservoir tank 21 is provided at an intermediate point in the return passage 19. The fluid pressure source 20 includes a fluid pump 20a and an electric motor 20b. The motor 20b is driven by a driving current supplied by the controller 30, and drives the pump 20a. A bypass passage 22 extends from the supply passage 18 to the return passage 19, and has an orifice 23 disposed therein. The controller 30 controls the fluid pressures in the right and left power chambers 15R and 15L of the cylinder actuator 13 and controls the steering amount and direction of the right and left rear wheels 9R and 9L by supplying the driving current to the motor 20b and controlling the magnitude of the exciting current supplied to the solenoid 17a of the control valve 17.

The right and left rear wheels 9R and 9L are driving wheels. The right and left rear wheels 9R and 9L are connected with a final drive unit 25 having a limited slip differential, through right and left axle shafts 24, respectively. The limited slip differential used in this embodiment is disclosed in Japanese patent application No. 59-187780.

In a housing of the final drive unit 25, a differential case is rotatably supported. In the differential case, pinion mate gears rotatably supported on a pinion mate shaft are in mesh with a pair of right and left side gears which are splined to the right and left axle shafts, respectively. A pair of pressure rings are disposed outside the side gears. Each of the pressure rings is not rotatable relative to the differential case, but axially slidable. Both pressure rings are connected with the pinion mate shaft through a cam mechanism. A friction clutch is provided between each of the pressure rings and the differential case. An engagement force of each clutch is varied by controlling a fluid pressure applied on a fluid pressure piston. Thus, a magnitude of a force limiting a differential action of the differential is controlled.

Pressure chambers of the fluid pressure piston for providing the engagement force for the above mentioned clutches are connected with a differential control valve 27 through passages 26R and 26L. The valve 27 is an electromagnetic valve having four ports and three positions. The control valve 27 is put in one of the three positions in accordance with the magnitude of an exciting current supplied to a solenoid 27a of the valve 27 by the controller 30. The differential control valve 27 is connected with a fluid pressure source 40 through a supply passage 28 and a return passage 29. The above-mentioned reservoir tank 21 is provided in the return passage 29.

The fluid pressure source 40 includes a fluid pressure pump 40a and a motor 40b. The motor 40b is driven by a driving current which is a differential control signal produced by the controller 30. The pump 40a discharges a working fluid by being driven by the motor 40b. The supply passage 28 and return passage 29 are connected together by a bypass passage 41 in which an orifice 42 is provided.

A vehicle speed sensor 31 and a rear wheel steer angle sensor 32 are connected with the controller 30. The vehicle speed sensor 31 senses a vehicle speed, and delivers a vehicle speed signal DV representing the vehicle speed, to the controller 30. The rear wheel steer angle sensor 32 senses a steer angle of the rear wheels 9R and 9L, and delivers a rear wheel steer angle signal D$\phi$ representing the rear wheel steer angle and direction of the rear wheels 9R and 9L, to the controller 30.

There is further provided a limited slip differential sensor 33 which is a differential rpm sensor for serving as a means for sensing a slip limiting amount. The limited slip differential sensor 33 senses the slip limiting amount between the right and left rear wheels 9R and 9L, and delivers a slip limiting amount signal DL representing the slip limiting amount, to the controller 30. The slip limiting amount is a magnitude of a resistive force developed by the friction clutches or other slip limiting means.

Manually operated changeover switches 34, 35, 36 and 37 are connected with the controller 30. The switch 34 is one for selecting an automatic control steering mode. The switch 35 is one for selecting an opposite phase fixed ratio steering mode. The switch 36 is for selecting an in-phase fixed ratio steering mode, and 37 is for selecting a two wheel steering mode. When any one of the switches 34–37 is selected, a corresponding mode signal DMi (i is any one of a, b, c and d) is supplied to the controller 30.

In the automatic control mode, the controller 30 increases the steer angle ratio of the rear wheel steer angle to the front wheel steer angle as the vehicle speed increases. At high vehicle speeds, the controller 30 steers the rear wheels in the same direction as the front wheels by increasing the steer angle ratio to improve the stability during cornering. At low vehicle speeds, the controller 30 steers the rear wheels in the opposite direction to the steering direction of the front wheels by making the steer angle ratio negative to reduce the turning radius. In the opposite phase or in-phase fixed ratio mode, the steer angle ratio of the rear wheel steer angle to the front wheel steer angle is fixed without regard to the vehicle speed. (For example, the fixed steer angle ratio is equal to one.). The rear wheels are steered at a predetermined constant steer angle ratio in the direction opposite to the steering direction of the front wheels in the opposite phase fixed ratio mode. When the in-phase fixed ratio mode is selected, the rear wheels are steered in the same direction as the front wheel steering direction at a predetermined constant steer angle ratio. In the two wheel steering mode, only the front wheels are steered, and the rear wheels are not steered.

There are further provided indicators 34a, 35a, 36a and 37a, which are connected in series, respectively, with the mode switches 34–37 for indicating the steering mode selected by the driver, by means of light. A reference numeral 38 denotes a power supply such as a battery.

FIG. 2 shows the operating state of the four wheel steer system when the opposite phase fixed ratio steering mode is selected. As shown by arrows in FIG. 2, the mechanical front wheel steering system is operated by the steering wheel 7, and the hydraulic type rear wheel steering system is controlled by the controller 30.

The controller 30 has a microcomputer including an interface circuit 30a, a central processing unit (CPU) 30b and a memory section 30c made up of one or more storage devices such as RAM and ROM, an A/D converter (not shown), and an output circuit (not shown). The mode signals DMa–DMd of the mode switches 34–37, the vehicle speed signal DV of the vehicle speed sensor 31, the steering wheel angle signal D$\theta$ of the steering wheel angle sensor 8, the rear wheel steer angle signal D$\phi$ of the rear wheel steer angle sensor 32, and the slip limiting amount signal DL of the limited slip differential sensor 33 are supplied to the CPU 30b of the microcomputer through the A/D converter and the interface circuit 30a. The CPU 30b processes the input signals according to one or more programs stored in the memory section 30c, and delivers, through the output circuit, driving currents to the motors 20b and 40b of the fluid pressure sources 20 and 40, and exciting currents to the solenoids 17a and 27a of the control valves 17 and 27, respectively.

The controller 30 controls the rear wheel steer angle in a manner shown in FIG. 3. As shown by a solid line A in FIG. 3, a ratio of the rear wheel steer angle to the steering wheel angle is relatively large when the slip limiting amount is small. As shown by a broken line B in FIG. 3, the ratio of the rear wheel steer angle to the steering wheel angle is relatively small when the slip limiting amount is great. The characteristics shown in FIG. 3 are a plot of the rear wheel steer angle $\phi$ as a function of the steerng wheel angle $\theta$, with the slip limiting amount as a parameter.

The controller 30 controls the slip limiting amount of the limited slip differential according to one of the following methods, for example.

(1) When the motor 40b of the fluid pressure source 40 is driven so that the speed of the motor 40b is constant, the controller 30 controls the slip limiting amount by bringing the solenoid 27a of the differential control valve 27 to on and off states intermittently and controlling a duty ratio (or cycle) of the intermittent operation. When the on period of the solenoid 27a is increased, the fluid pressure supplied to the limited slip differential is increased, and accordingly the slip limiting amount is increased. When the off period of the solenoid 27a is increased, the fluid pressure is decreased, and accordingly the slip limiting amount is decreased.

(2) When the motor 40b is a motor whose speed is variable, the controller 30 controls the slip limiting amount primarily by varying the speed of the motor 40b in accordance with the vehicle speed, and secondarily by opening and closing the control valve 27.

The control system of this embodiment is operated as follows:

The controller 30 decreases the magnitude of the slip limiting resistive force by decreasing the fluid pressure supplied to the means for applying pressure to the friction clutches of the limited slip differential when the vehicle speed is low. When the vehicle speed is high, the controller 30 increases the magnitude of the slip limiting resistive force by increasing the fluid pressure supplied to the limited slip differential. In this way, the controller 30 provides an adequate control of the transfer ratio between the torque deliver to the faster wheel and the torque deliver to the slower wheel.

(1) When the vehicle speed is lower than a predetermined value: In this case, the controller 30 controls the slip limiting magnitude in accordance with the vehicle speed, but prevents the control of the ratio of the rear wheel steer angle to the steering wheel angle in accordance with the magnitude of the slip limiting force. When the vehicle speed is low, the slip limiting magnitude is controlled at such a low level that the understeer tendency is not increased excessively. Therefore, the desired weak understeer characteristic can be maintained.

(2) When the vehicle speed is equal to or higher than the predetermined value: In this case, the controller 30 performs the control of the ratio of the rear wheel steer angle to the steering wheel angle in accordance with the slip limiting amount. That is, the controller 30 increases the ratio of the rear wheel steer angle to the steering wheel angle when the slip limiting amount is small, and decreases the ratio when the slip limiting magnitude is great. In this way, the control system of the invention can prevent an excessive increase of the understeer tendency due to the slip limiting action. Therefore, the desired weak understeer is maintained, and the cornering performance of the vehicle is improved.

In this embodiment, the limited slip differential is one of a torque proportional type which utilizes a cam mechanism for producing a slip limiting resistive force in a friction clutch mechanism. However, it is optional to employ a limited slip differential of a preload type which utilizes a spring mechanism for producing a slip limiting resistive force in a friction clutch mechanism, or a limited slip differential of a torque proportional plus preload type which utilizes a cam mechanism and a preload spring mechanism. For composing the controller 30, electronic circuits such as comparing circuits and logic circuits may be used instead of a microcomputer.

A U.S. patent application Ser. No. 770,567 filed on Aug. 29, 1985, now U.S. Pat. No. 4,679,463, shows an example of a limited slip differential usable in the present invention.

What is claimed is:

1. A vehicle comprising;
   a four wheel steer system for varying a rear wheel steer angle in response to a control signal,
   a differential disposed between right and left drive wheels of said vehicle,
   slip limiting means for limiting a differential action of said differential,
   means for sensing a slip limiting amount of said slip limiting means, and
   controlling means for producing said control signal and controlling a ratio of the rear wheel steer angle to a steering wheel angle in accordance with said slip limiting amount sensed by slip limiting amount sensing means.

2. A vehicle according to claim 1 wherein said controlling means comprises means for increasing said ratio when slip limiting amount decreases, and for decreasing said ratio when slip limiting amount increases.

3. A vehicle according to claim 1 wherein said controlling means comprises means for varying said ratio in accordance with slip limiting amount only when vehicle speed is higher than a predetermined speed.

4. A vehicle according to claim 3 where said controlling means comprises means for controlling said slip limiting means to vary slip limiting amount in accordance with vehicle speed.

5. A vehicle according to claim 4 wherein said controlling means comprises means for controlling said slip limiting means to increase slip limiting amount when vehicle speed increases.

6. A vehicle according to claim 5 wherein said slip limiting means comprises a friction clutch for limiting said differential action of said differential with a resistive force, and said slip limiting amount is a magnitude of said resistive force developed by said friction clutch.

* * * * *